US012062160B2

(12) United States Patent
Abbeloos et al.

(10) Patent No.: US 12,062,160 B2
(45) Date of Patent: Aug. 13, 2024

(54) SYSTEM FOR IMAGE COMPLETION

(71) Applicants: TOYOTA JIDOSHA KABUSHIKI KAISHA, Aichi-ken (JP); KATHOLIEKE UNIVERSITEIT LEUVEN, Leuven (BE); ETH Zurich, Zurich (CH)

(72) Inventors: Wim Abbeloos, Hove (BE); Gabriel Othmezouri, Ixelles (BE); Liqian Ma, Heverlee (BE); Stamatios Georgoulis, Zurich (CH); Luc Van Gool, Zurich (CH)

(73) Assignees: TOYOTA JIDOSHA KABUSHIKI KAISHA, Aichi-Ken (JP); KATHOLIEKE UNIVERSITEIT LEUVEN, Leuven (BE); ETH ZURICH, Zurich (CH)

( * ) Notice: Subject to any disclaimer, the term of this patent is extended or adjusted under 35 U.S.C. 154(b) by 285 days.

(21) Appl. No.: 17/478,837

(22) Filed: Sep. 17, 2021

(65) Prior Publication Data

US 2022/0092746 A1   Mar. 24, 2022

(30) Foreign Application Priority Data

Sep. 22, 2020 (EP) ..................................... 20197574

(51) Int. Cl.
 *G06T 5/77* (2024.01)
 *G06T 3/04* (2024.01)
 (Continued)

(52) U.S. Cl.
 CPC .................. *G06T 5/77* (2024.01); *G06T 3/04* (2024.01); *G06T 3/18* (2024.01); *G06T 3/4023* (2013.01);
 (Continued)

(58) Field of Classification Search
 CPC ... G06T 7/70; G06T 2207/10016; G06T 5/50; G06T 2207/20221; G06T 7/50;
 (Continued)

(56) References Cited

U.S. PATENT DOCUMENTS 11,523,055 B1 *  12/2022  Chaudhri .............. G06T 3/4053
2008/0031543 A1 *  2/2008  Nakajima ............ H04N 5/2624
                                                    348/E5.053
(Continued)

OTHER PUBLICATIONS

Zachary Teed et al., "DEEPV2D: Video to Depth With Differentiable Structure From Motion," Apr. 2020, available at https://doi.org/10.48550/arXiv.1812.04605, published at ICLR 2020, pp. 1-7. (Year: 2020).*

(Continued)

*Primary Examiner* — Ian L Lemieux
*Assistant Examiner* — Woo C Rhim
(74) *Attorney, Agent, or Firm* — HAUPTMAN HAM, LLP

(57) ABSTRACT

A system for image completion is disclosed. The system comprises a coordinate generation module configured to receive past frames and a present frame having a first field-of-view and to generate a set of coordinate maps, one for each of the received past frames; and a frame aggregation module configured to receive as input the past frames, the present frame, and the coordinate maps and to synthesize, based on said input, a present frame having a second field-of-view.

16 Claims, 6 Drawing Sheets

(51) Int. Cl.
  *G06T 3/18* (2024.01)
  *G06T 3/4023* (2024.01)
  *G06T 5/50* (2006.01)
  *G06T 7/50* (2017.01)
  *G06T 7/70* (2017.01)

(52) U.S. Cl.
  CPC ............... *G06T 5/50* (2013.01); *G06T 7/50* (2017.01); *G06T 7/70* (2017.01); *G06T 2207/10016* (2013.01); *G06T 2207/20212* (2013.01); *G06T 2207/30244* (2013.01)

(58) Field of Classification Search
  CPC ............ G06T 2207/10024; G06T 7/73; G06T 2207/20084; G06T 2207/30244; G06T 3/0093; G06T 5/005; G06T 7/55; G06T 7/33; G06T 3/0012; G06T 3/4023; G06T 2207/20212; G06T 3/4038; G06V 10/82; H04N 23/698; H04N 5/265
  See application file for complete search history.

(56) References Cited

U.S. PATENT DOCUMENTS

| | | | | |
|---|---|---|---|---|
| 2014/0210949 A1* | 7/2014 | Berkovich | .............. | G06T 17/05 348/46 |
| 2015/0373269 A1* | 12/2015 | Osborne | .............. | G06T 3/4038 348/38 |
| 2016/0088287 A1* | 3/2016 | Sadi | .............. | H04N 5/265 348/43 |
| 2017/0148143 A1* | 5/2017 | Snider | .............. | G06T 3/4007 |
| 2018/0197320 A1* | 7/2018 | Lim | .............. | G06T 7/593 |
| 2018/0231985 A1* | 8/2018 | Sun | .............. | G06N 3/084 |
| 2019/0109985 A1* | 4/2019 | Chang | .............. | H04N 23/90 |
| 2019/0355103 A1* | 11/2019 | Baek | .............. | G06T 5/005 |
| 2020/0020075 A1* | 1/2020 | Khwaja | .............. | G06T 5/002 |
| 2021/0327026 A1* | 10/2021 | Lebrun | .............. | G06T 5/20 |
| 2021/0342983 A1* | 11/2021 | Lin | .............. | G06T 5/005 |
| 2022/0053124 A1* | 2/2022 | Zhou | .............. | H04N 23/50 |
| 2022/0327674 A1* | 10/2022 | You | .............. | G06T 7/571 |
| 2023/0343108 A1* | 10/2023 | Hemantharaja | .............. | G06V 10/82 |

OTHER PUBLICATIONS

Lee et al., "Video Extrapolation Using Neighboring Frames", ACM transactions on Graphics, vol. 38, No. 3, pp. 20:1-20:13, Apr. 2019, 13pp.

Cuhk et al., "Exploring Self-attention for Image Recognition", Conference on Computer Vision and Pattern Recognition (CVPR), pp. 10076-10085, 2020, 10pp.

Schlemper et al., "Attention Gated Networks: Learning to Leverage Salient Regions in Medical Images", arxiv.org, Cornell University Library, 201, Olin Library Cornell University Ithaca, NY 14853, pp. 1-25, Jan. 23, 2019, 25pp.

Godard et al., "Digging Into Self-Supervised Monocular Depth Estimation", arXiv:1806.01260, ICCV, pp. 3828-3838, 2019, 11pp.

Jaderberg et al., "Spatial Transformer Networks", NIPS, pp. 1-9, 2015, 9pp.

Wang et al., "Wide-Context Semantic Image Extrapolation", 2019 IEEE/CVF Conference on 30 Computer Vision and Pattern Recognition (CVPR), Long Beach, CA, USA, pp. 1399-1408, 2019, 10pp.

Yu et al., "Free-Form Image Inpainting with Gated Convolution", Proceedings of the IEEE/CVF International Conference on Computer Vision 15 (ICCV), pp. 4471-4480, 2019, 10pp.

* cited by examiner

SYSTEM FOR IMAGE COMPLETION

CROSS-REFERENCE TO RELATED APPLICATION

This application claims priority to European Patent Application No. EP20197574.5 filed on Sep. 22, 2020, incorporated herein by reference in its entirety.

BACKGROUND

1. Field of the Disclosure

The present disclosure relates to a system for image completion.

2. Description of Related Art

In the pursuit of intelligent machine perception, it is necessary to endow systems, like autonomous cars and robots, with an awareness of the scene content beyond their immediately visible field-of-view (FoV). This entails training and configuring those systems to predict additional FoV information from past information, for example to leverage information from past narrow FoV frames to infer the present scene at a wider FoV.

To the best of the knowledge of the inventors of the present application, FoV extrapolation from a narrow FoV to a wide FoV has never been addressed in the prior art. Several challenges can be envisioned with solving this problem. First, a large image size discrepancy may exist between the input narrow FoV frames and the output wide FoV frame. This discrepancy has to be bridged while achieving adequate temporal consistency in the video output. Second, certain areas in the wide FoV frame may change significantly, or may even not appear at all in any of the past narrow FoV frames. Thus, lots of details need to be hallucinated in the wide FoV frame. And, third, there may be ambiguity between information contained in the narrow FoV frames and the wide FoV ground truth. This ambiguity which may vary depending on frame region can mislead the prediction training process.

Related problems in the art can be found in the area of video-based image synthesis. For example, video inpainting aims to hallucinate missing pixels, conditioned on visible pixels, in a narrow FoV frame. Similarly, future video prediction focuses on hallucinating future frames conditioned on past and present frames, all within narrow FoV.

Video extrapolation generally adopts 2D or 3D geometry-based image warping and stitching techniques to blend observed pixels of adjacent narrow FoV frames in order to extend the FoV. However, video extrapolation does not address the problem of pixels not observed in the narrow FoV.

Novel view synthesis aims to generate images of a given object or scene from different viewpoints by blending the observed pixels, as well as hallucinating a few missing pixels mainly for dis-occlusion. The technique is heavily reliant on highly-accurate multi-view geometry to produce good results, especially when applied to a video scene.

SUMMARY

The present disclosure provides a system for image completion, including:
 a coordinate generation module configured to receive first past frames and a first present frame, the first past frames and the first present frame having a first field-of-view (FoV) and to generate a set of coordinate maps, one for each of the received first past frames and first present frame, wherein the coordinate map corresponding to a first past frame provides a spatial mapping of the first past frame to a coordinate system of the first present frame;
 a frame aggregation module configured to receive as input the first past frames, the first present frame, and the coordinate maps and to synthesize, based on said input, a second present frame having a second FoV.

According to embodiments, the first and second FoV may be equal or different.

In an embodiment, the second FoV is larger than the first FoV. For example, the second FoV may have a greater width and/or length in pixels than the first FoV.

Depending of the application, the first FoV may be considered a "narrow FoV" and the second FoV may be considered a "wide FoV."

In an embodiment, the first FoV and the second FoV may be specified as parameters of the system at initialization time.

Through the coordinate maps, the coordinate generation module thus enables the propagate information contained in the past frames to the coordinate system of the first present frame. This allows for the information from past frames to be combined with information from the first present frame. Specifically, the frame aggregation module uses the coordinate maps to appropriately warp the information from past frames for their ultimate combination.

In an embodiment, the coordinate generation module may include:
 a depth network configured to receive the first past frames and to generate a depth map for each of the received first past frames;
 a pose network configured to receive frame pairs of time-adjacent frames formed from the received first past frames and the first present frame and to generate a relative camera pose for each of the received frame pairs; and a coordinate calculation module configured to generate the set of coordinate maps based on outputs of the depth network and the pose network.

The depth map for a given frame indicates, for every pixel in the frame, an estimate of the distance between the camera and the object represented by the pixel.

The relative camera pose $p_{t-i}$ corresponding to time-adjacent frames $I_{t-j}$, $I_{t-j+1}$) represents an estimate of the relative rotation and translation of the camera position from time (t−j) to time (t−j+1).

In an embodiment, the coordinate calculation module may be configured, for each first past frame, to calculate a rigid flow from the first present frame to the past frame and to calculate the coordinate map for the first past frame based on the calculated rigid. The rigid flow from the first present frame to the first past frame indicates respective pixel displacements that would be applied to pixels of the first present frame to warp the first present frame to the first past frame.

In an embodiment, the frame aggregation module may be configured to propagate information contained in the received first past frames to the coordinate system of the first present frame using the set of coordinate maps generated by the coordinate generation module.

In an embodiment, the frame aggregation module may include:
 an encoder configured to generate a plurality of feature maps based on each of the first past frames and the first present frame;

a warping module (configured, for each of the first past frames and the first present frame, to warp the plurality of feature maps associated with said each frame, using the respective coordinate map associated with said each frame, to generate a plurality of warped feature maps for said each frame; and an attention-based feature aggregation (AFA) module configured to aggregate, over all of the first past frames and the first present frame, the generated warped feature maps to generate a set of aggregated feature maps.

In an embodiment, the AFA module may be configured in the aggregation to emphasize, for each frame of the first past frames and the first present frame, region-specific features of the frame based on a timing of the frame relative to the first present frame.

In an embodiment, the AFA module may be configured to emphasize, for older frames (of the first past frames and the first present frame), frame regions farther from the center of the frame (e.g., regions more than a predetermined distance from the center); and for later frames, frame regions near the center of the frame (e.g., regions less than a predetermined distance from the center). The insight behind such aggregation scheme is that frame regions far from the center are more likely to have been observed, and with lower depth/pose errors, in the older frames than in the more recent frames. In contrast, frame regions near the center of the frame are more likely to have been observed, and with lower depth/pose errors, in the more recent frames than the older frames. As such, robustness to depth/pose errors is improved.

In an embodiment, the AFA module may be configured to, for each frame of the first past frames and the first present frame:

generate a respective frame-wise spatial attention map for each of the warped feature maps associated with said each frame; and multiply each of the warped feature maps associated with said each frame with the respective spatial attention map to generate a respective feature map.

In an embodiment, the AFA module may be further configured to sum, over all of the first past frames and the first present frame, the generated respective feature maps to generate the set of aggregated feature maps.

In an embodiment, the frame aggregation module may further include a U-net module configured to generate the second present frame having the second FoV based on the set of aggregated feature maps In an embodiment, the U-net module may include:

a context normalization sub-module configured to receive the set of aggregated feature maps and to out-paint regions of the second present frame falling outside of the field-of-view of the first present frame;

a decoder sub-module configured to receive feature maps output by the context normalization sub-module and to process said feature maps output by the context normalization sub-module to in-paint occluded or unobserved regions (in the first past and/or first present frames) falling within the field-of-view of the first present frame; and a gated self-attention (GSA) sub-module configured to receive feature maps output by the decoder sub-module and to spatially aggregate said feature maps output by the decoder sub-module.

In an embodiment, the GSA sub-module may be configured to spatially aggregate the feature maps output by the decoder sub-module based on weights that are dynamically generated per feature vector (i.e., per pixel) based on a spatial location of the feature vector (or pixel) in the frame.

In an embodiment, the ambiguity level between an estimated frame having the second FoV and the ground truth associated with that second FoV may vary from one region to another in the second FoV frame (i.e., there is a correlation between ambiguity level and location). As such, aggregating feature maps based on weights dynamically generated based on location allows for the feature aggregation to be dynamically adapted based on the ambiguity level of the feature vectors being aggregated. As such, the impact of ambiguity is reduced, improving feature aggregation performance.

In an embodiment, the proposed system may include a hallucination uncertainty module configured to generate an uncertainty map associated with the second present frame.

By generating the uncertainty map associated with the second present frame, the hallucination uncertainty module provides a mechanism to interpret the hallucination uncertainty at each pixel of the second present frame. This can assist systems using the image completion system to better process any additional FoV information generated by the image completion system. Such systems may be decision-making systems such as self-driving cars, autonomous robots, and VR/AR systems, to name a few examples.

During training, the uncertainty map may be used to weight a loss function spatially to reduce supervision mismatch (supervision mismatch is the mismatch between a prediction result and ground truth; spatial displacement may cause the supervision mismatch to be large even though the prediction result may be visually acceptable, causing training convergence difficulties). Specifically, the weighting of the loss function by the uncertainty map attenuates the effect of pixels with high hallucination uncertainty on the loss function value and helps temper the training objective.

In an embodiment, the hallucination uncertainty module may be configured to generate the uncertainty map to minimize a loss function incorporating hallucination uncertainty.

In an embodiment, the hallucination uncertainty module may be configured to generate the uncertainty map based on predicting regions of the second present frame that will have high hallucinating uncertainty and those that will have low hallucinating uncertainty.

In an embodiment, a portion of the first past frames received by the depth network and the frame aggregation module may be replaced by second past frames (having the second FoV) generated by the frame aggregation module and corresponding to said portion of the first past frames. This helps improves temporal consistency (i.e. color and structure jitter) in a video of the generated wide FoV frames.

In an embodiment, the second past frames may be each concatenated with a respective uncertainty map generated by the hallucination uncertainty module, before providing them to the frame aggregation module. As such, the uncertainty maps are used to introduce a confidence signal into the input of the frame aggregation module, which reflects an estimation confidence level for each of the second past frames. This allows the system to account for hallucination uncertainty per pixel per estimated second past frame In an embodiment, any of the above-described features may be implemented as instructions of a computer program. As such, the present disclosure provides a computer program including instructions that when executed by a processor cause the processor to implement a system for image completion as described above.

The computer program can use any programming language and may take the form of a source code, an object code, or a code intermediate between a source code and an object code, such as a partially compiled code, or any other desirable form.

The computer program may be recorded on a computer-readable medium. As such, the present disclosure is also directed to a computer-readable medium having recorded thereon a computer program as described above. The computer-readable medium can be any entity or device capable of storing the computer program.

BRIEF DESCRIPTION OF THE DRAWINGS

Further features and advantages of the present disclosure will become apparent from the following description of certain embodiments thereof, given by way of illustration only, not limitation, with reference to the accompanying drawings in which.

DETAILED DESCRIPTION OF EMBODIMENTS

Figure 1:
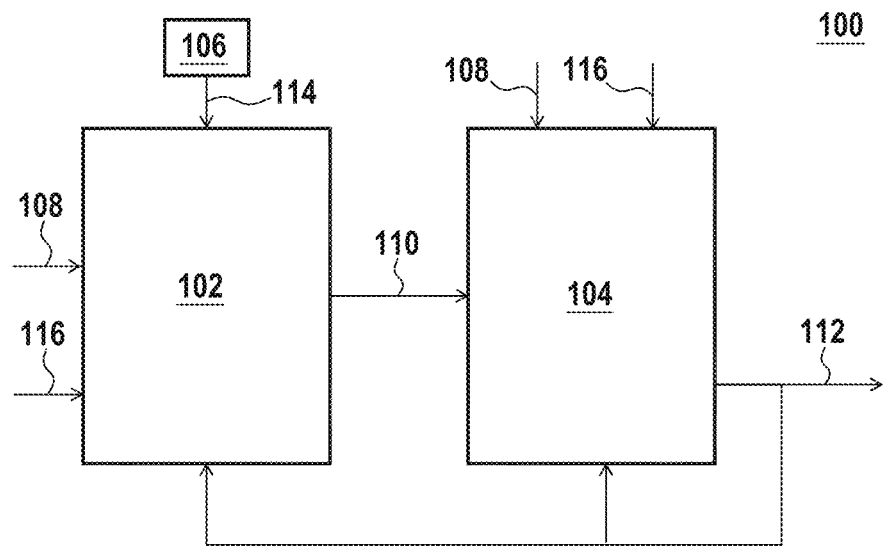
FIG. 1 illustrates an example image completion system according to an embodiment.

FIG. 1 illustrates an example system 100 for image completion according to an embodiment of the present disclosure. Example system 100 is provided for the purpose of illustration and not limitation of embodiments of the present disclosure.

As shown in FIG. 1, example system 100 is based on a two-stage recurrent framework that includes a coordinate generation module 102 and a frame aggregation module 104. A hallucination uncertainty module 106 may also be provided.

Coordinate generation module 102 is configured to receive first past frames 108 and a first present frame 116 and to generate a set of coordinate maps 110, one per received first past frame. The coordinate map corresponding to a first past frame provides a spatial mapping of the first past frame to the first present frame. In an embodiment, the first past frames 108 and the first present frame 116 have a first FoV (e.g., 208×128 pixels).

Frame aggregation module 104 is configured to receive the first past frames 108 and the first present frame 116, as well as the coordinate maps 110 from module 102. Frame aggregation module 104 is configured to synthesize a second present frame 112 based on the received input. In an embodiment, the second present frame 112 has a second FoV.

The second FoV may be equal to or different than the first FoV. In an embodiment, the second FoV is larger than the first FoV. For instance, the second FoV may have a greater width and/or length in pixels than the first FoV. For example, where the first FoV is 208×128 pixels, the second FoV may be 416×128 pixels.

In an embodiment, to improve temporal consistency in the generated second frames (having the second FoV), a portion of the first past frames, input into the modules 102 and 104, may be replaced with their corresponding second frames generated by frame aggregation module 104.

Frame aggregation module 104 may be configured to propagate information contained in the past frames (which include first past frames, and optionally also second past frames) to the coordinate system of the first present frame using the coordinate maps 110.

In an embodiment, frame aggregation module 104 may be configured to generate a plurality of feature maps based on each input frame. The feature maps may be multi-scale feature maps.

The frame aggregation module 104 may use the coordinate map 110 corresponding to a given past frame to warp the plurality of feature maps associated with the past frame. For the first present frame, as it is already in the correct coordinate system, no warping is necessary and the warped feature maps correspond to the original feature maps.

Subsequently, frame aggregation module 104 may be configured to aggregate the warped feature maps over all frames to generate aggregated feature maps. In an embodiment, the aggregation of the warped feature maps uses an attention-based feature aggregation scheme. The attention-based feature aggregation scheme is trained to learn to select the useful features among the frames in order to address issues caused by depth/pose errors (i.e., errors in the coordinate maps) and by frame inconsistency. This improves the fusion of the multi-frame information on the feature level.

The frame aggregation module 104 may be configured to generate the second present frame 112 based on the aggregated feature maps.

In an embodiment, the frame aggregation module 104 may use a context normalization based technique to outpaint (extrapolate) regions falling outside the first FoV.

In an embodiment, the frame aggregation module 104 may use a gated convolution technique to in-paint (complete) occluded or unobserved regions falling within the first FoV.

In an embodiment, the frame aggregation module 104 may implement a Gated Self-Attention (GSA) mechanism to allow the system to be adaptable to observations with different ambiguity levels. The GSA mechanism may be configured to spatially aggregate feature maps based on weights that are dynamically generated according to local information (ambiguity being different from region to region).

In an embodiment, the frame aggregation module 104 may implement an uncertainty mechanism. Specifically, hallucination uncertainty module 106 may be provided to generate an uncertainty map 114 associated with the second present frame 112. The uncertainty map serves to interpret the hallucination uncertainty at each pixel. During training, the uncertainty map may be used to weight a loss function spatially to reduce supervision mismatch (supervision mismatch is the mismatch between a prediction result and ground truth; spatial displacement may cause the supervision mismatch to be large even though the prediction result may be visually acceptable, causing training convergence difficulties). Specifically, the weighting of the loss function by the uncertainty map attenuates the effect of pixels with high hallucination uncertainty on the loss function value and helps temper the training objective.

Figure 2:
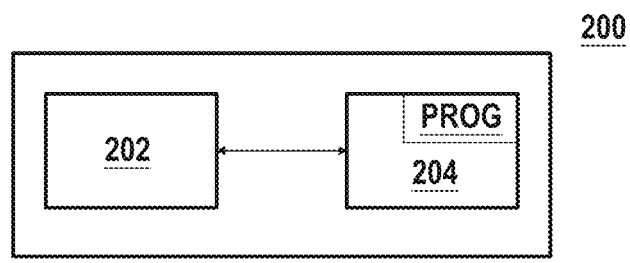
FIG. 2 illustrates an example computer implementation of the system of FIG. 1.

In an embodiment, system 100 may be implemented on a computer system such as computer system 200 shown in FIG. 2. Specifically, system 100, and any of its modules and mechanisms, may be implemented as a computer program including instructions that, when executed by a processor 202 of computer system 200, cause the processor 202 to execute methods or functions of system 100 as described herein. In an embodiment, the computer program may be recorded on a computer-readable medium 204 of computer system 200.

In the following, detailed operation of system 100 is presented with reference to FIGS. 3-8.

Without loss of generality, system 100 will be described for the particular embodiment in which the second FoV is larger (in terms of width and/or length) than the first FoV. For example, the first FoV may be 208×128 pixels and the second FoV may be 416×128 pixels. Accordingly, for simplification, the first FoV will be referred to as "narrow FoV" and the second FoV will be referred to as "wide FoV." As would be understood by a person of skill in the art based on the teachings herein, embodiments are not limited by this particular embodiment.

For the simplification of presentation, the operation of system 100 is described from the processing perspective of a present narrow FoV frame $I_t$ to generate a present wide FoV frame $O_t$. Accordingly, system 100 may be considered as a FoV extrapolation system. However, as described above, system 100 is not limited to FoV extrapolation.

Figure 3:
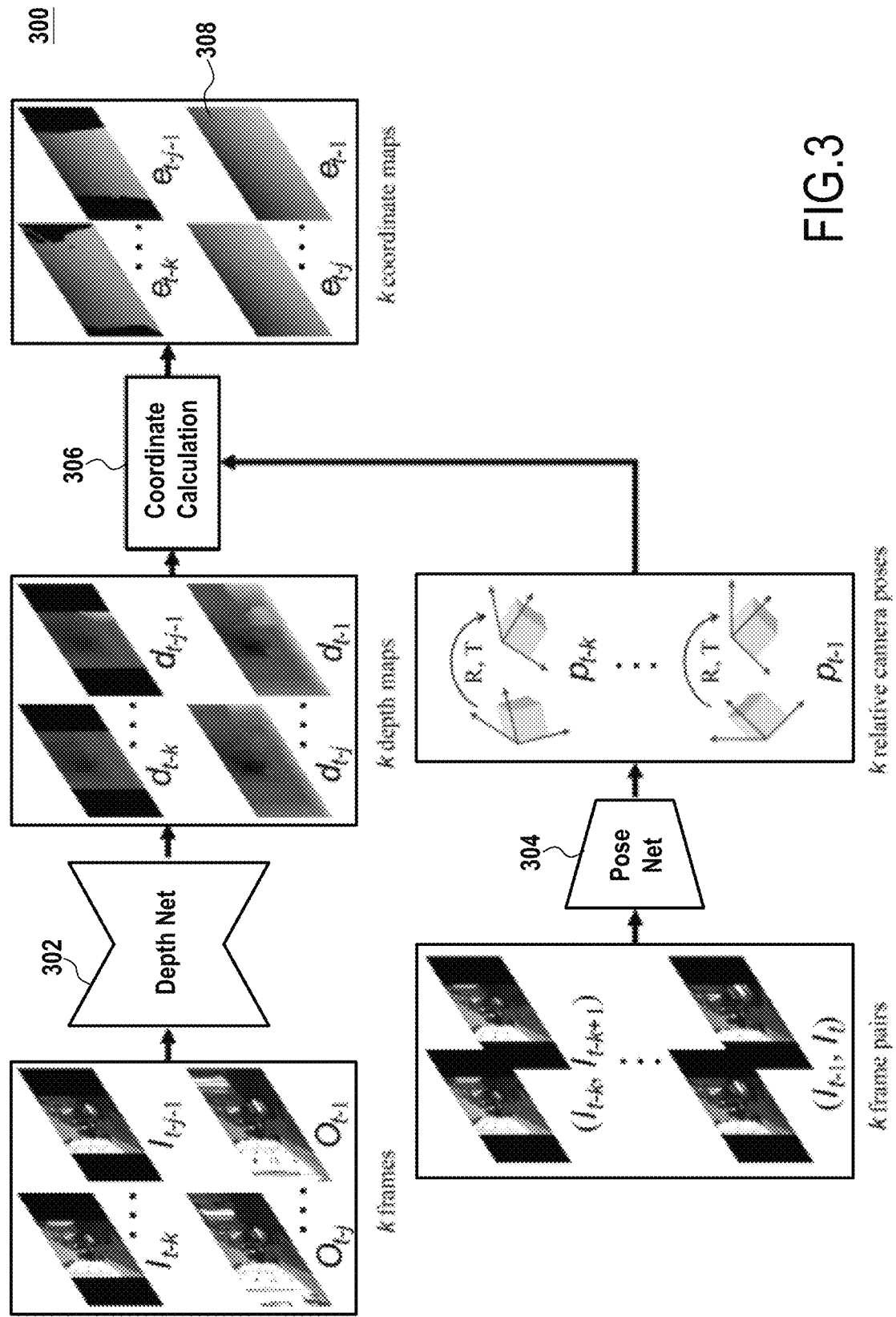
FIG. 3 illustrates an example coordinate generation module according to an embodiment.

FIG. 3 illustrates an example coordinate generation module 300 according to an embodiment. Example coordinate generation module 300 is provided for the purpose of illustration and not limitation of embodiments of the present disclosure. Example coordinate generation module 300 may be an embodiment of coordinate generation module 102.

As shown in FIG. 3, coordinate generation module 300 includes a depth network 302, a pose network 304, and a coordinate calculation module 306.

Depth network 302 is configured to receive a plurality of past frames. The past frames may include narrow FoV frames and past wide FoV frames. For the purpose of illustration, it assumed in the following description that the depth network 302 receives k frames. The k frames may include (k–j) past narrow FoV frames (denoted in FIG. 3 as $I_{t-k}, \ldots, I_{t-j-1}$) and j past wide FoV frames (denoted in FIG. 3 as $O_{t-j}, \ldots, O_{t-1}$). In an embodiment, k may be equal to 5 and j may be between 1 and 5.

The past frames may be RGB frames, depth frames, or semantic segmentation frames, for example. The frames may be derived from the same camera source or from different camera sources and translated to the same camera reference.

Depth network 302 generates a depth map d for each of the received k frames. In an embodiment, depth network 302 generates depth maps $d_{t-k}, \ldots, d_{t-j-1}$ corresponding respectively to past narrow FoV frames $I_{t-k}, \ldots, I_{t-j-1}$ and generates depth maps $d_{t-j}, \ldots, d_{t-1}$ corresponding respectively to past wide FoV frames $O_{t-j}, \ldots, O_{t-1}$.

The depth map for a given frame indicates, for every pixel in the frame, an estimate of the distance between the camera and the object represented by the pixel.

Pixel depth estimation is well-known to a person of skill in the art and will not be described herein. In an embodiment, depth network 302 may be implemented as a fully convolutional U-net as described in detail in "Clément Godard, Oisin Mac Aodha, Michael Firman, Gabriel Brostow, Digging into self-supervised monocular depth estimation, arXiv:1806.01260, in ICCV, 2019". Specifically, the depth network 302 may include a well-known VGG16BN encoder and a decoder of several convolutional layers. The input may be a RGB image frame (3 channels), and the output is a depth map (1 channel) of the same resolution.

Pose network 304 receives as input k pairs of narrow FoV frames and generates a relative camera pose for each of the k frame pairs. In an embodiment, the k frame pairs include the frame pairs $(I_{t-k}, I_{t-k+1}), \ldots, (I_{t-1}, I_t)$, i.e., adjacent frame pairs over the time t (present) narrow FoV frame and the k–i past narrow FoV frames. The resulting relative camera poses are denoted as $p_{t-k}, \ldots, p_{t-1}$.

The relative camera pose $p_{t-i}$ corresponding to adjacent narrow FoV frames $I_{t-i}, I_{t-i+1}$) represents an estimate of the relative rotation and translation of the camera position from time (t–j) to time (t–j+1).

Relative camera pose estimation is well-known to a person of skill in the art and will not be described herein. In an embodiment, pose network 304 may be implemented as described in detail in "Clément Godard, Oisin Mac Aodha, Michael Firman, Gabriel Brostow, Digging into self-supervised monocular depth estimation, arXiv:1806.01260, in ICCV, 2019". Specifically, pose network 304 may include a ResNet18 encoder that receives as input a pair of RGB images (3+3 channels) and that produces as output a 6-channel vector.

Coordinate calculation module 306 is configured to calculate k coordinate maps 308 based on the outputs of depth network 302 and pose network 304. In an embodiment, (k–j) maps ($e_{t-k}, \ldots, e_{t-j+1}$) corresponding respectively to the (k–j) past narrow FoV frames ($I_{t-k}, \ldots, I_{t-j-1}$) and j maps ($e_{t-j}, \ldots, e_{t-1}$) corresponding respectively to the j past wide FoV frames ($O_{t-j}, \ldots, O_{t-1}$) are calculated.

The coordinate map corresponding to a past (narrow or wide FoV) frame provides a spatial mapping of the past frame to the present narrow FoV frame $I_t$. In other words, the coordinate map indicates for each pixel of the past frame its corresponding coordinates in the present frame $I_t$.

In an embodiment, the coordinate map for a past frame $I_i$ or $O_i$ (i=t–k, t–i) is obtained by first calculating a rigid flow matrix from the present frame $I_t$ to the past frame according to:

$$f_{t \to i}^{rig}(e_i) = KT_{i \to t} D_i(c_i) K^{-1} c_i - c_i$$

where K denotes the intrinsic matrix of the camera, $T_{i \to t}$ denotes the relative camera pose from the past frame $I_i$ to the present frame, $c_i$ represents a matrix of the homogeneous (or projective) coordinates of the pixels in the present frame $I_i$, and $D_i(c_i)$ represents the depth value of the position $c_i$.

The rigid flow from the present frame $I_t$ to the past frame indicates respective pixel displacements that would be applied to pixels of the present frame $I_t$ to warp the present frame $I_t$ to the past frame.

Using the calculated rigid flow, a coordinate map $\hat{e}_{t \to i}$ that spatially matches the present frame $I_t$ to the past frame can then be computed. The coordinate map $\hat{e}_{t \to i}$ can be obtained by adding the rigid flow to a regular 2D grid (2 channels) (e.g., a 3×3 2D grid with the values [[[1,1,1], [2,2,2], [3,3,3]], [[1,2,3], [1,2,3], [1,2,3]]]). Finally, the coordinate map $\hat{e}_{t \to i}$ is reversed to obtain the coordinate map coordinate map $e_i$, which spatially matches the past frame to the present frame $I_t$. In the reversal of the coordinate map $\hat{e}_{t \to i}$ to obtain the coordinate map coordinate map $e_i$, if a pixel (x0, y0) of the present frame $I_t$ is spatially matched to the pixel (u0, v0) of the past frame in the coordinate map $\hat{e}_{t \to i}$, then the pixel (u0, v0) of the past frame will be spatially matched to the pixel (x0, y0) of the present frame $I_t$ in the coordinate map $e_t$.

Figure 4:
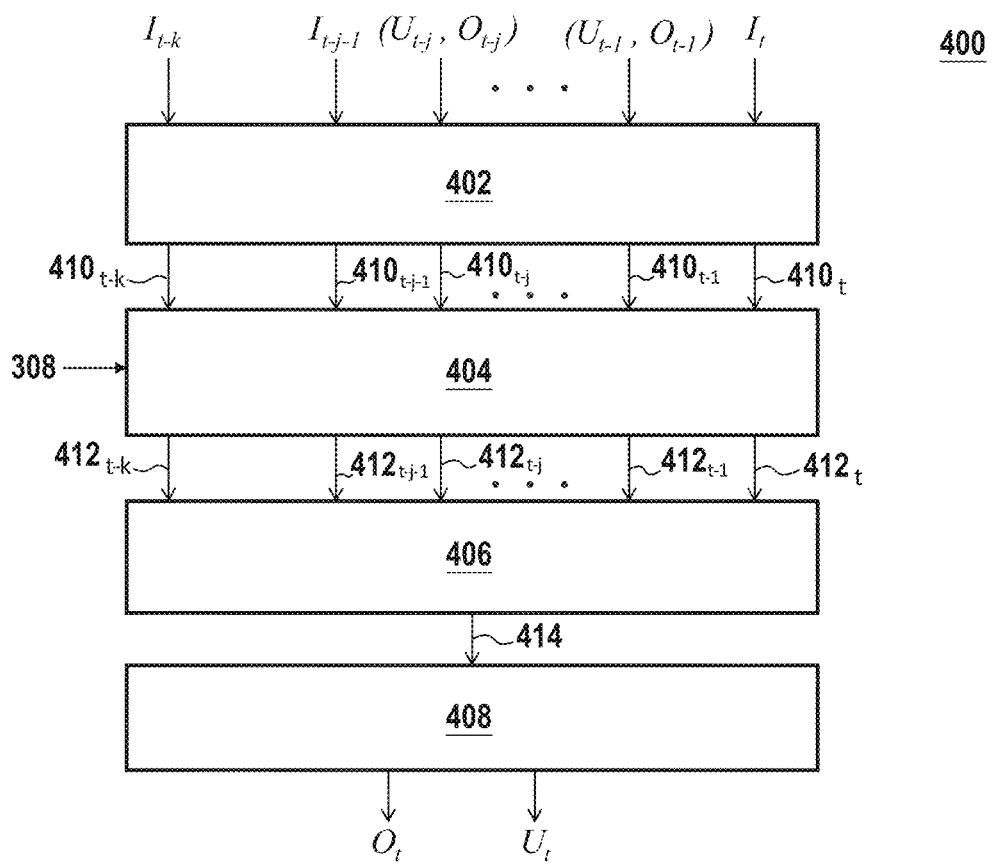
FIG. 4 illustrates an example frame aggregation module according to an embodiment.

FIG. 4 illustrates an example frame aggregation module 400 according to an embodiment. Example frame aggregation module 400 is provided for the purpose of illustration and not limitation of embodiments of the present disclosure. Example frame aggregation module 400 may be an embodiment of frame aggregation module 104.

As shown in FIG. 4, example frame aggregation module 400 includes an encoder 402, a warping module 404, an attention-based feature aggregation (AFA) module 406, and a U-net module 408.

Encoder 402 is configured to receive as input k+1 frames. At initialization, the k+1 frames correspond to the k past narrow FoV frames (i.e., $I_{t-1}, \ldots, I_{t-k}$) and to the present narrow FoV frame $I_t$. After j iterations, to improve temporal coherency, the inputs corresponding to the past narrow frames $\{I_{t-i}\}_{i=1,\ldots,j}$ are replaced with the previous outputs $\{O_{t-i}\}_{i=1,\ldots,j}$ and their associated uncertainty maps $\{U_{t-i}\}_{i=1,\ldots,j}$ ($O_{t-j}$ and $U_{t-j}$ may be concatenated with each other channel by channel). For the purpose of simplification, FIG. 4 illustrates the encoder inputs after j iterations have taken place.

Encoder 402 is configured to generate a plurality (N) of feature maps 410 based on each received input frame. In an embodiment, the plurality of feature maps 410 may be multi-scale feature maps (i.e., having different spatial scales or sizes). In an embodiment, N may be equal to 3, though a greater number may be used.

In an embodiment, the encoder 402 may include a first convolutional layer configured to generate a first feature map based on the input frame. The first feature map may be a tensor of size H×W×C, where H is the frame height, W is the frame width, and C is a number of channels. For example, C may be equal to 128. The first feature map may be referred to as "level 0" feature map.

The encoder 402 may also include a second convolutional layer configured to receive the first feature map and to generate an intermediate second feature map based on the first feature map. The intermediate second feature map may be of size H1×W1×C, where at least one of H1 and W1 is lower respectively than H and W. The intermediate second feature map is then added to a downsized version of the first feature map of the same size (i.e., H1×W1×C) to generate a second feature map of size H1×W1×C. The second feature map may be referred to as "level 1" feature map.

The process described above may repeated with respect to the second feature map to obtain a third feature map of size H2×W2×C, where at least one of H2 and W2 is lower respectively than H and W. The third feature map may be referred to as "level 2" feature map.

The feature maps 410, generated for each of the k+1 input frames, are then provided to warping module 404.

Additionally, warping module 404 receives the k coordinate maps 308 from coordinate calculation module 306. As noted above, the k coordinate maps 308 include (k−j) maps ($e_{t-k}, \ldots, e_{t-j+1}$) corresponding respectively to the (k−j) past narrow FoV frames ($I_{t-k}, \ldots, I_{t-j-1}$) and j maps ($e_{t-j}, \ldots, e_{t-1}$) corresponding respectively to the j past wide FoV frames ($O_{t-j}, \ldots, O_{t-1}$).

In an embodiment, for each of the past frames (i.e., each of (k−j) past narrow FoV frames ($I_{t-k}, \ldots, I_{t-j-1}$) and the j past wide FoV frames ($O_{t-j}, \ldots, O_{t-1}$)), warping module 404 may be configured to use the respective coordinate map corresponding to the frame to propagate the feature maps 410 associated with the frame to the present narrow FoV frame $I_t$. The propagation of the feature maps 410 warps the feature maps 410, according to the coordinate map, to generate a plurality of warped feature maps 412 for the frame.

In an embodiment, the warping module 404 uses bilinear sampling as described in detail in Jaderberg, Max, Karen Simonyan, and Andrew Zisserman, "Spatial transformer networks," In NIPS. 2015. to propagate the multi-scale feature maps 410 based on the coordinate maps 308.

It is noted that the feature maps 410 corresponding to the present narrow FoV frame $I_t$ are not warped by warping module 404 because they are already in the coordinate system of the present frame. As such, the feature maps 412 are identical to the feature maps 410 for the present narrow FoV frame $I_t$.

The warped feature maps 412 (which may be different levels, e.g., level 0, 1, and 2) are then provided to AFA module 406, which is configured to aggregate the warped feature maps 412, over all of the k+1 frames, to generate aggregated feature maps 414. Warped feature maps resulting from narrow FoV frames may be padded with zeros to have the same size as warped feature maps resulting from wide FoV frames.

Figure 5:
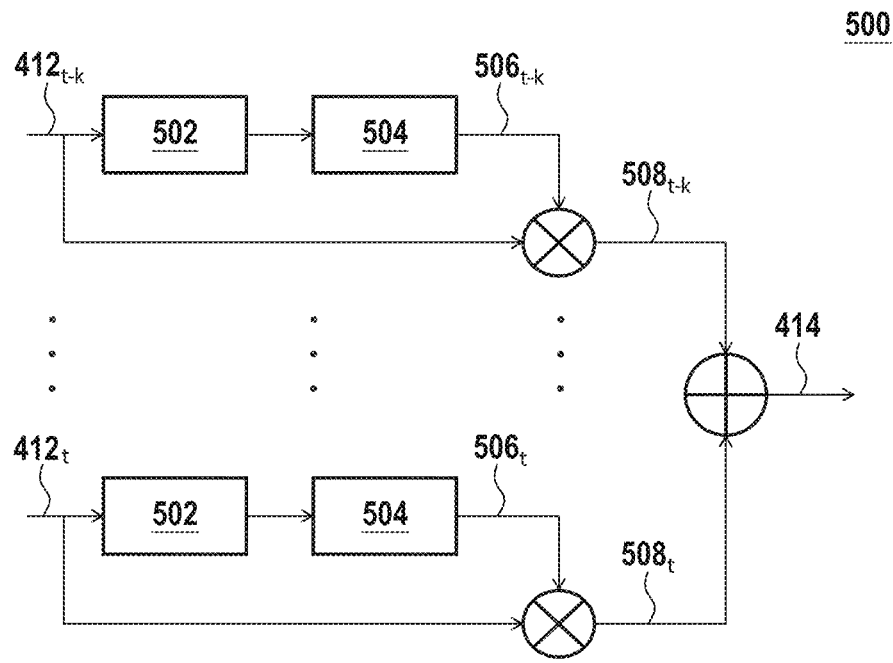
FIG. 5 illustrates an example attention-based feature aggregation (AFA) module for use in the frame aggregation module according to an embodiment.

In an embodiment, AFA module 406 may be implemented as shown in FIG. 5, which illustrates an example AFA module 500 according to an embodiment of the present disclosure. Example AFA module 500 is provided for the purpose of illustration only and is not limiting of embodiments.

As shown in FIG. 5, example AFA module 500 includes a plurality of channels each configured to receive the warped feature maps 412 (e.g., level 0, 1, and 2) corresponding to a given frame of the k+1 frames.

Figure 7A:
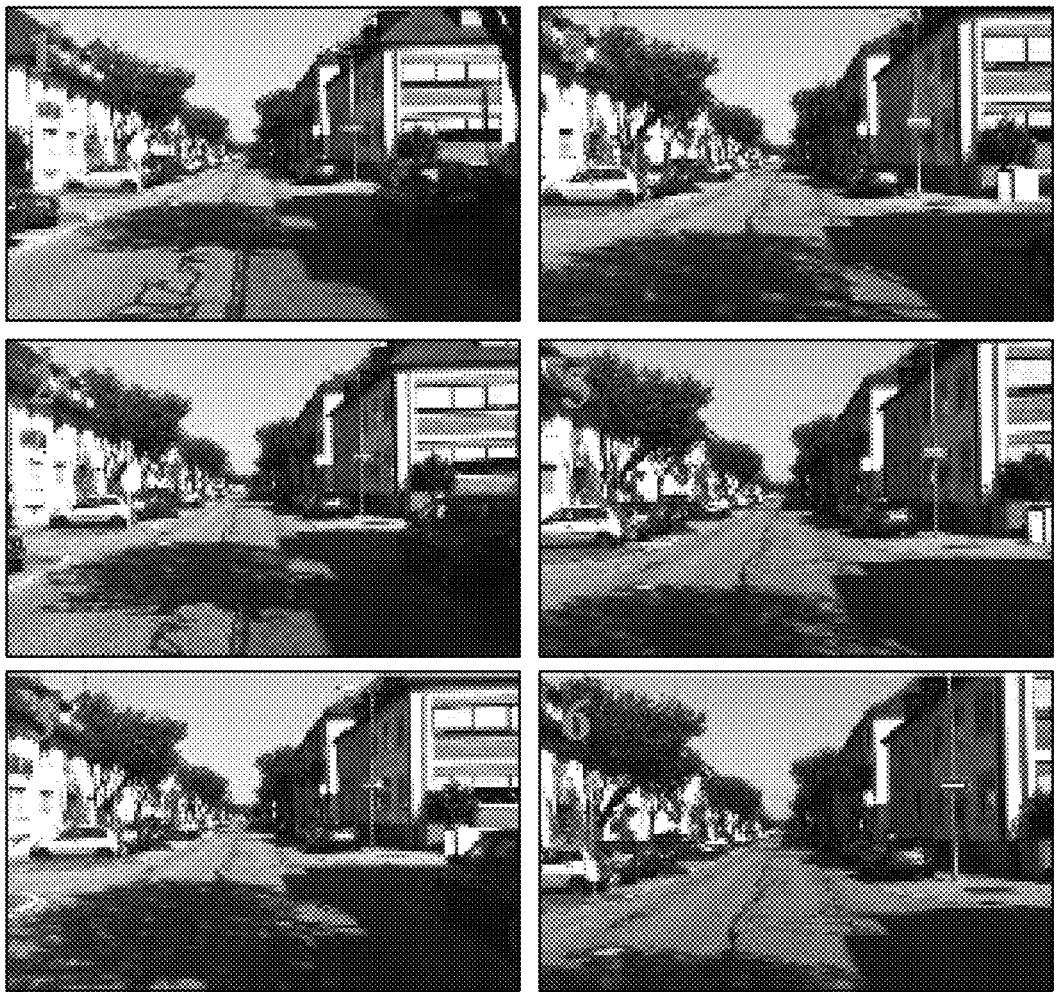
FIG. 7A illustrates example narrow FoV frames.
Figure 7B:
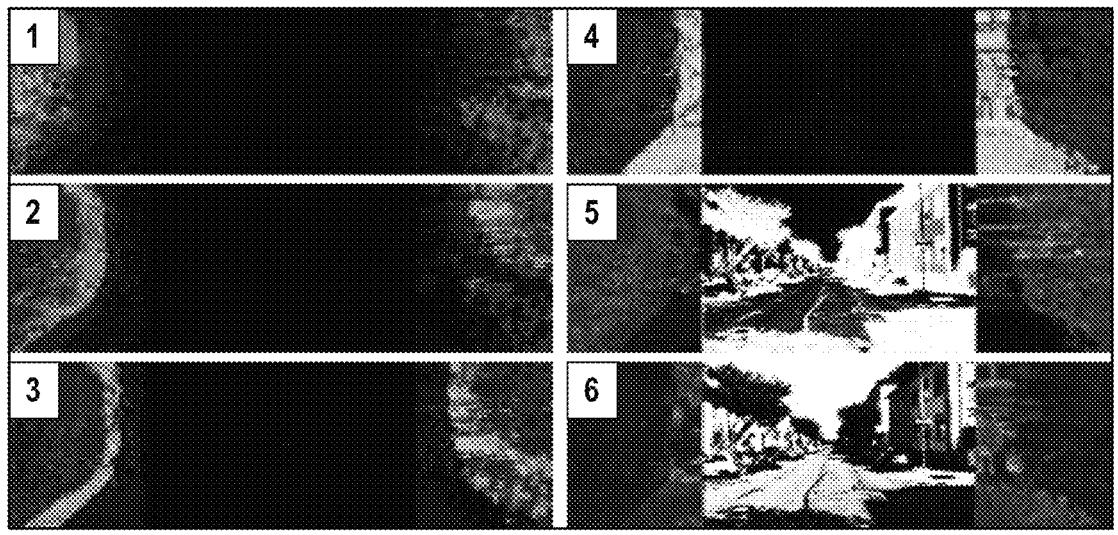
FIG. 7B illustrates example attention maps generated based on the example narrow FoV frames of FIG. 7A according to an embodiment.

Within each channel, the warped feature maps 412 of a respective frame are each fed into a convolutional layer 502, followed by a softmax normalization module 504, to generate a respective frame-wise spatial attention map 506. In an embodiment, a level 0 spatial attention map, a level 1 spatial attention map, and a level 2 spatial attention map are generated. For the purpose of illustration, FIG. 7B shows example level 0 attention maps corresponding to a sequence of example narrow FoV frames shown in FIG. 7A.

Each of the warped feature maps 412 is then multiplied by its respective spatial attention map 506 to generate a respective feature map 508. Thus, for each frame, a plurality of feature maps 508 (e.g., level 0, level 1, and level 2) are obtained.

The use of spatial attention maps as described above allows to focus on or select specific features of each frame for subsequent aggregation with other frames. In an embodiment, the spatial attention maps 506 are configured to emphasize, for older frames of the k+1 frames (e.g., frames t−k to t−j−1), frame regions farther from the center of the frame (e.g., regions more than a predetermined distance from the center); and for later frames of the k+1 frames (e.g., frames t−j to t), frame regions near the center of the frame (e.g., regions less than a predetermined distance from the center).

The resulting feature maps 508 are then summed, across all frames, to generate the aggregated feature maps 414. In an embodiment, this includes summing, across all frames, all level 0 feature maps 508 together, all level 1 feature maps 508 together, and all level 2 feature maps 508 together.

Returning to FIG. 4, the aggregated feature maps 414 are then provided to U-net module 408. U-net module 408 is configured to synthesize the present wide FoV frame $O_t$ based on the aggregated feature maps 414. Additionally, in an embodiment, U-net module 408 also outputs an uncertainty map $U_t$ associated with the wide FoV frame $O_r$. The uncertainty map serves to interpret (explain) the hallucination uncertainty at each pixel and to guide the learning by reducing supervision ambiguity.

In an embodiment, U-net module 408 implements mechanisms for hallucinating missing regions, for example by in-painting (completing) occluded or unobserved regions falling within the narrow FoV and/or out-painting (extrapolating) regions falling outside the narrow FoV. Image in-painting and out-painting are known techniques in the art. Specifically, image in-painting aims to hallucinate the missing pixels through warping, or to generate the missing pixels conditioned on the neighboring (spatial or temporal dimensions) visible pixels. Image out-painting typically adopts 2D or 3D geometry-based image warping and stitching techniques to blend the observed pixels of adjacent narrow FoV frames in order to extend the FoV.

Figure 8:
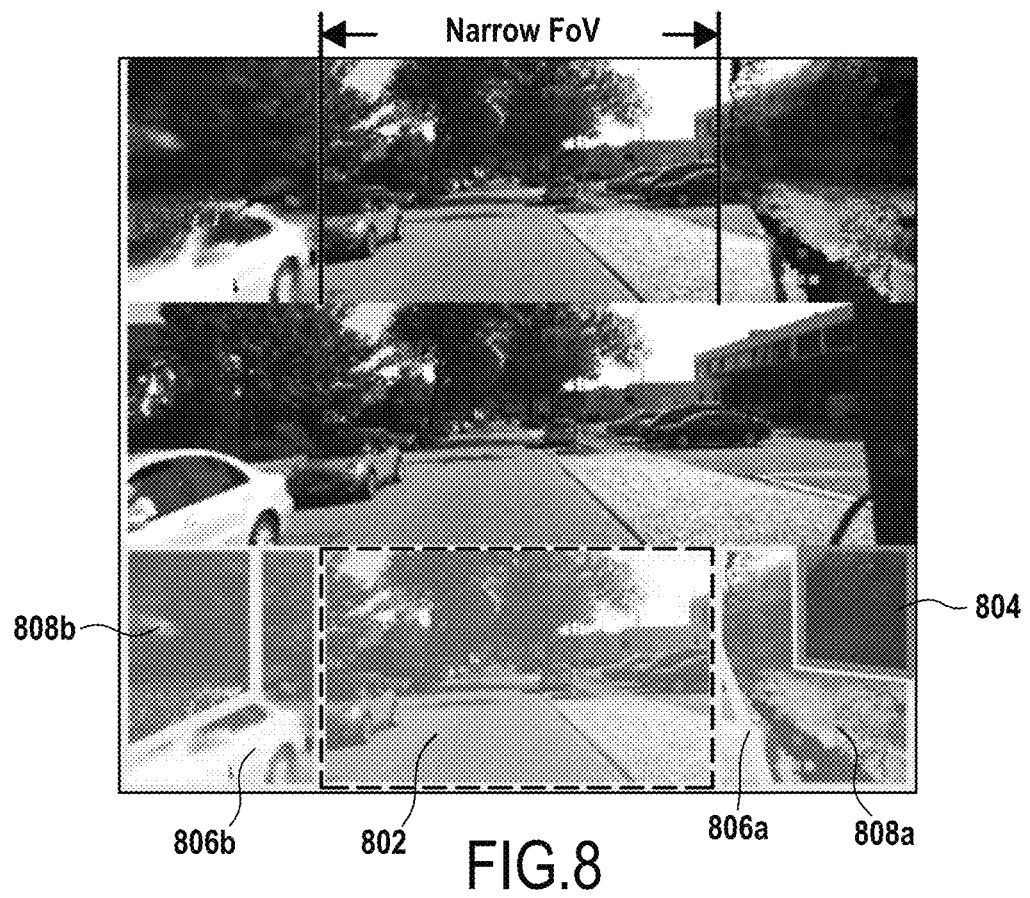
FIG. 8 is an example that illustrates the ambiguity in an estimate wide FoV frame relative to the wide FoV ground truth.

Optionally, U-net module 408 may include a Gated Self-Attention (GSA) mechanism. The motivation for the GSA mechanism is that, typically, the ambiguity level between an estimated wide FoV frame and the wide FoV ground truth may vary from one region to another in the wide FoV frame. For example, as illustrated in FIG. 8, the pixels in the wide FoV frame can be roughly divided into four categories: (a) the observed narrow FoV pixels in the present frame (e.g., region 802 of the frame), for which there is no ambiguity; (b) the propagated pixels from past frames with accurate propagation (e.g., regions 806*a* and 806*b*), for which ambiguity is low; (c) the propagated pixels from past frames with noisy propagation (e.g., regions 808*a* and 808*b*), characterized by a medium ambiguity level; and (d) the pixels corresponding to unobserved regions (e.g., region 804), for which the ambiguity level is high. As further described below, the GSA mechanism is configured to ensure that the model is adaptable to observations with different ambiguity levels.

Figure 6:
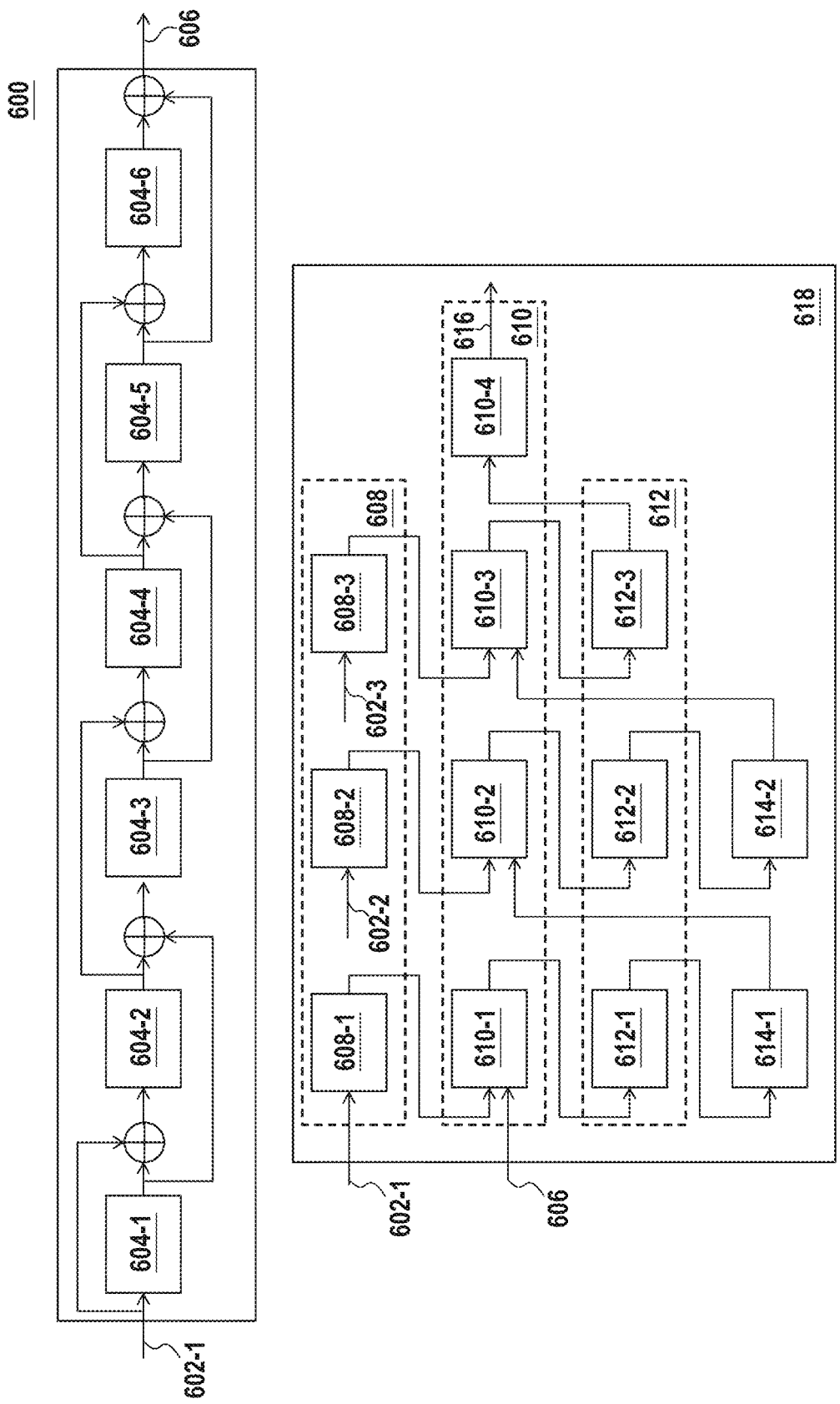
FIG. 6 illustrates an example U-net for use in the frame aggregation module according to an embodiment.

In an embodiment, U-net module 408 may be implemented as shown in FIG. 6, which illustrates an example U-net module 600 according to an embodiment of the present disclosure. Example U-net module 600 is provided for the purpose of illustration only and is not limiting of embodiments.

As shown in FIG. 6, U-net module 600 includes a bottleneck module 604 and a decoder module 618.

In an embodiment, bottleneck module 604 includes a plurality of successive layers 604-1, ..., 604-6. 6. Layers 604-1, ..., 604-6 may each be implemented as a residual dilated convolutional layer. Such a layer can be described by the equation y=x+conv(x), where y is the layer output, x is the layer input, and conv(x) denotes a dilated convolution of the input x.

In an embodiment, decoder module 618 includes a context normalization sub-module 608, a decoder sub-module 610, a gated self-attention (GSA) sub-module 612, and up-sampling modules 614.

Context normalization sub-module 608 may be configured to out-paint (extrapolate) regions falling outside the narrow FoV.

In an embodiment, sub-module 608 comprises a plurality of context normalization layers 608-1, 608-2, and 608-3. In an embodiment, normalization layers 608-1, 608-2, and 608-3 may each be implemented as described in Y. Wang, X. Tao, X. Shen and J. Jia, "Wide-Context Semantic Image Extrapolation," in 2019 *IEEE/CVF Conference on Computer Vision and Pattern Recognition (CVPR)*, Long Beach, CA, USA, 2019 pp. 1399-1408. As such, layers 608-1, 608-2, and 608-3 may be configured to transfer the mean and the variance from the observed region features to the unobserved region features.

However, unlike in Wang et al, where the mask is given in the input, an aggregated mask that indicates the unobserved regions after propagating the past frames may be used. As such, it can be recognized that a large amount of wide view information has been observed in the past frames and this information can simply be propagated into the present wide FoV frame, rather than hallucinated.

Decoder sub-module 610 may be configured to in-paint (complete) occluded or unobserved regions falling within the narrow FoV.

In an embodiment, sub-module 610 includes a plurality of decoder layers 610-1, 610-2, 610-3, and 610-4. Decoder layers 610-1, 610-2, 610-3, and 610-4 may each be implemented as a gated convolution layer as described in Jiahui Yu, Zhe Lin, Jimei Yang, Xiaohui Shen, Xin Lu, Thomas S. Huang, "Free-form image inpainting with gated convolution," in Proceedings of the IEEE/CVF International Conference on Computer Vision (ICCV), 2019, pp. 4471-4480.

GSA sub-module 612 may be configured to perform feature aggregation with self-attention. Specifically, unlike a traditional convolution operator which performs feature aggregation using a convolution kernel of fixed pre-trained weights (to combine features from nearby locations), sub-module 612 may be configured to dynamically generate the kernel weights per feature vector (i.e., per pixel) based on the location of the feature vector. In an embodiment, as the ambiguity is directly correlated with location (as described above with respect to FIG. 8), the kernel weights may be dynamically adapted per feature vector based on the ambiguity level of the feature vectors being aggregated. As such, the impact of ambiguity is reduced, improving feature aggregation performance.

In an embodiment, GSA sub-module 612 includes a plurality of GSA layers 612-1, 612-2, and 612-3. GSA layers 612-1, 612-2, and 612-3 may each be implemented as a patch-wise self-attention block as described in Hengshuang Zhao, Jiaya Jia, and Vladlen Koltun, "Exploring self-attention for image recognition," In Conference on Computer Vision and Pattern Recognition (CVPR), 2020. Specifically, the patch-wise self-attention block can be described by the following equation:

$$y_i = \sum_{j \in R(i)} \alpha(x_{R(i)})_j \odot \beta(x_j)$$

where $\alpha(x_{R(i)})_j = \gamma(\delta(x_{R(i)}))$, $y_i$ denotes the new aggregated feature, R(i) denotes the aggregation footprint (e.g., 3×3 or 7×7 pixels), $x_{R(i)}$ denotes a tensor corresponding to the patch of feature vectors in the aggregation footprint, $\alpha(x_{R(i)})_j$ represents the attention vector (i.e., weight vector) at location j in the tensor $\alpha(x_{R(i)})$ and which corresponds spatially to the feature vector $x_j$ in the tensor $x_{R(i)}$, $\beta$ is a function that generates the feature vectors $\beta(x_j)$, and $\odot$ is the Hadamard product.

The functions $\beta$ and $\gamma$ are mappings implemented via one convolution layer, respectively. The function $\delta$ combines the feature vectors $x_j$ from the patch $x_{R(i)}$ and may be implemented using a concatenation operation.

In an embodiment, to reduce the impact of vanishing gradients during training, the self-attention block may be wrapped by a residual structure: $z = Conv_r(y) + x$, where Conv$_r$ denotes a residual convolutional layer, y is the output of the self-attention block, and x is the input of the self-attention block.

In another embodiment, the self-attention may further include a gating mechanism to deal with regions with high ambiguity, formulated as:

$$g = \text{sigmoid}(\text{Conv}_g(z)) \odot \tanh(\text{Conv}_a(z))$$

where Conv$_g$ and Conv$_a$ denote a gating convolutional layer and an attention convolutional layer. The gating mechanism controls the path(s) through which information flows in the network. Particularly, in an embodiment, the gating mechanism may be configured to allow only feature vectors with an ambiguity above a certain level to flow through the network and/or to limit the flow of feature vectors with ambiguity above a certain level. Image quality can thus be improved.

In an embodiment, bottleneck module 604 may be configured to receive as input, via the first layer 604-1, an aggregated feature map 602-1 and to generate a modified aggregated feature map 606. Feature map 602-1 may be a level 2 aggregated feature map of size (H/4×W/4×C), where H is the frame height, W is the frame width, and C is the number of channels. Feature map 606 may be of the same size as feature map 602-1.

Context normalization layers 608-1, 608-2, and 608-3 are configured to receive respective aggregated feature maps 602-1, 602-2, and 602-3. Aggregated feature maps 602-1, 602-2, and 602-3 may correspond respectively to level 2, level 1, and level 0 aggregated feature maps. As an example, feature map 602-1 may be of size (H/4×W/4×C), feature map 602-2 may be of size (H/2×W/2×C), and feature map 602-3 may be of (H×W×C), where H is the frame height, W is the frame width, and C is the number of channels.

In an embodiment, context normalization layers 608-1, 608-2, and 608-3 are configured to feed respectively decoder layers 610-1, 610-2, and 610-3, which in turn are configured to feed respectively GSA layers 612-1, 612-2, and 612-3.

Concurrently with receiving the respective outputs of context normalization layers 608-1, 608-2, and 608-3, decoder layers 610-1, 610-2, and 610-3 further receive as input respectively the output 606 of bottleneck module 604, the output of GSA layer 612-1 (up-sampled by up-sampling module 614-1), and the output of GSA layer 612-2 (up-sampled by up-sampling module 614-2). For example, the combined inputs of decoder layers 610-1, 610-2, and 610-3 may be of size (H'×W'×2C), and the outputs of the layers may be of size (H'×W'×2C), where H'=H/4, H/2, and H respectively and W'=W/4, W/2, and W respectively for layers 610-1, 610-2, and 610-3.

Decoder layer 610-4 receives an input the output of GSA layer 612-3 and generates an output 616 comprising the present wide FoV frame O$_t$.

Returning to FIG. 1, as mentioned above, in an embodiment, system 100 may include a hallucination uncertainty module 106. Specifically, hallucination uncertainty module 106 may be provided to generate an uncertainty map 114 associated with the generated wide FoV frame 112. The uncertainty map serves to interpret the hallucination uncertainty at each pixel of the wide FoV frame.

Additionally, the uncertainty map may be used to temper the training objective by attenuating the effect of pixels with high hallucinating uncertainty on the loss function value, thereby reducing supervision mismatch and speeding up training convergence.

In an embodiment, the hallucination uncertainty module 106 may be trained to generate an uncertainty map based on predicting the regions of the wide FoV frame that will have high hallucinating uncertainty and those that will have low hallucinating uncertainty. The generated uncertainty map reflects this prediction by assigning an estimated hallucination uncertainty per pixel of the wide FoV frame.

In an embodiment, hallucination uncertainty module 106 may be trained to generate the uncertainty map 114 to minimize a loss function incorporating hallucination uncertainty.

In an embodiment, the loss function incorporating hallucination uncertainty is a pixel level reconstruction L1 loss function.

In an embodiment, the loss function incorporating hallucination uncertainty is given by the equation:

$$L_{1U} = \mathbb{E}\left[\frac{\|O_t - W_t\|_1}{U_t} \odot M_{view} + \|O_t - W_t\|_1 \odot (1 - M_{view}) + U_t\right]$$

where O$_t$ is the present wide FoV frame, W$_t$ is the ground truth wide FoV frame, a is the predicted uncertainty map associated with O$_t$, M$_{view}$ is a mask for out-of-narrow view regions, and the $\odot$ operator denotes element-wise multiplication. The loss function is computed per pixel and then averaged over all pixels.

According to the above equation, it is noted that the narrow FoV region, given by (1−M$_{view}$), is not weighted by the uncertainty map U$_t$. This is because this region corresponds to pixels that are observed in the narrow FoV frame. The right-most U$_t$ term is a regularization term that helps stabilize loss gradients.

In an embodiment, to make the uncertainty U$_t$ more interpretable and further stabilize the training process, a is constrained in the range (0, 1) using a sigmoid function.

Additionally, as shown in FIG. 4, previously generated uncertainty maps $\{U_{t-i}\}_{i=1 \ldots j}$ may be used in the present input to act as a confidence signal. In an embodiment, this is done by concatenating the past uncertainty maps with respective past estimated wide FoV frames.

Although the present disclosure has been described above with reference to certain specific embodiments, it will be understood that the disclosure is not limited by the particularities of the specific embodiments. Numerous variations, modifications and developments may be made in the above-described embodiments within the scope of the appended claims.

What is claimed is:

1. A system for image completion, comprising:
a coordinate generation module configured to receive first past frames and a first present frame, the first past frames and the first present frame having a first field-of-view, and to generate a set of coordinate maps, one for each of the received first past frames, wherein the coordinate map corresponding to a first past frame provides a spatial mapping of the first past frame to a coordinate system of the first present frame, wherein the coordinate generation module comprises:
   a depth network configured to receive the first past frames and to generate a depth map for each of the received first past frames;
   a pose network configured to receive frame pairs of time-adjacent frames formed from the received first past frames and the first present frame and to generate a relative camera pose for each of the received frame pairs independent from the depth map for each of the received first past frames; and a coordinate calculation module configured to generate the set of coordinate maps based on outputs of the depth network and the pose network; and a frame aggregation module configured to receive as input the first past frames, the first present frame, and the coordinate maps and to synthesize, based on said input, a second present frame having a second field-of-view, wherein a portion of the first past frames received by a depth network and the frame aggregation module are replaced by second past frames having the second field-of-view generated by the frame aggregation module and corresponding to said portion of the first past frames.

2. The system according to claim 1, wherein the first field-of-view comprises fewer pixels than the second field-of-view.

3. The system according to claim 1, wherein the frame aggregation module is configured to propagate information contained in the received first past frames to the coordinate system of the first present frame using the set of coordinate maps generated by the coordinate generation module.

4. The system according to claim 1, wherein the frame aggregation module comprises:
   an encoder configured to generate a plurality of feature maps based on each of the first past frames and the first present frame;
   a warping module configured, for each of the first past frames and the first present frame, to warp the plurality of feature maps associated with said each frame, using the respective coordinate map associated with said each frame, to generate a plurality of warped feature maps for said each frame; and
   an attention-based feature aggregation module configured to aggregate, over all of the first past frames and the first present frame, the generated warped feature maps to generate a set of aggregated feature maps.

5. The system according to claim 4, wherein the attention-based feature aggregation module is configured in the aggregation to emphasize, for each frame of the first past frames and the first present frame, region-specific features of the frame based on a timing of the frame relative to the first present frame.

6. The system according to claim 4, wherein the attention-based feature aggregation module is configured to, for each frame of the first past frames and the first present frame:
   generate a respective frame-wise spatial attention map for each of the warped feature maps associated with said each frame; and
   multiply each of the warped feature maps associated with said each frame with the respective spatial attention map to generate a respective feature map.

7. The system according to claim 6, wherein the attention-based feature aggregation module is further configured to sum, over all of the first past frames and the first present frame, the generated respective feature maps to generate the set of aggregated feature maps.

8. The system according to claim 4, wherein the frame aggregation module further comprises a U-net module configured to generate the second present frame based on the set of aggregated feature maps, the U-net module comprising:
   a context normalization sub-module configured to receive the set of aggregated feature maps and to out-paint regions of the second present frame falling outside of the field-of-view of the first present frame;
   a decoder sub-module configured to receive feature maps output by the context normalization sub-module and to process said feature maps output by the context normalization sub-module to in-paint occluded or unobserved regions falling within the field-of-view of the first present frame; and
   a gated self-attention sub-module configured to receive feature maps output by the decoder sub-module and to spatially aggregate said feature maps output by the decoder sub-module.

9. The system according to claim 8, wherein the gated self-attention sub-module is configured to spatially aggregate the feature maps output by the decoder sub-module based on weights that are dynamically generated per feature vector based on a spatial location of the feature vector.

10. The system according to claim 1, comprising:
    a hallucination uncertainty module configured to generate an uncertainty map associated with the second present frame.

11. The system according to claim 10, wherein the hallucination uncertainty module is configured to generate the uncertainty map to minimize a loss function incorporating hallucination uncertainty.

12. The system according to claim 10, wherein the hallucination uncertainty module is configured to generate the uncertainty map based on predicting regions of the second present frame that will have a first hallucinating uncertainty and those that will have a second hallucinating uncertainty, and the first hallucinating uncertainty is higher than the second hallucinating uncertainty.

13. The system according to claim 1, wherein the second past frames are each concatenated with a respective uncertainty map generated by a hallucination uncertainty module, before providing the second past frames to the frame aggregation module.

14. The system according to claim 1, wherein the second field-of-view is equal or greater than the first field-of-view.

15. A system for image completion, comprising:
    a coordinate generation module configured to receive first past frames and a first present frame, the first past frames and the first present frame having a first field-of-view, and to generate a set of coordinate maps, one for each of the received first past frames, wherein the coordinate map corresponding to a first past frame provides a spatial mapping of the first past frame to a coordinate system of the first present frame; and
    a frame aggregation module configured to receive as input the first past frames, the first present frame, and the coordinate maps and to synthesize, based on said input, a second present frame having a second field-of-view, wherein the frame aggregation module comprises:
    an encoder configured to generate a plurality of feature maps based on each of the first past frames and the first present frame;
    a warping module configured, for each of the first past frames and the first present frame, to warp the plurality of feature maps associated with said each frame, using the respective coordinate map associated with said each frame, to generate a plurality of warped feature maps for said each frame; and
    an attention-based feature aggregation module configured to aggregate, over all of the first past frames and the first present frame, the generated warped feature maps to generate a set of aggregated feature maps.

16. A system for image completion, comprising:
    a coordinate generation module configured to receive first past frames and a first present frame, the first past frames and the first present frame having a first field-of-view, and to generate a set of coordinate maps, one for each of the received first past frames, wherein the coordinate map corresponding to a first past frame provides a spatial mapping of the first past frame to a coordinate system of the first present frame; and a frame aggregation module configured to receive as input the first past frames, the first present frame, and the coordinate maps and to synthesize, based on said input, a second present frame having a second field-of-view, wherein a portion of the first past frames received by a depth network and the frame aggregation module are replaced by second past frames having the second field-of-view generated by the frame aggregation module and corresponding to said portion of the first past frames.

* * * * *